United States Patent

[11] 3,609,098

[72] Inventor James D. Brown
Bartlesville, Okla.
[21] Appl. No. 852,107
[22] Filed Aug. 21, 1969
[23] Division of Ser. No. 610,466, Jan. 20, 1967.
[45] Patented Sept. 28, 1971
[73] Assignee Phillips Petroleum Company

[54] HALOESTER AND CUPROUS SALT POLYMERIZATION CATALYST SYSTEMS
5 Claims, No Drawings
[52] U.S. Cl. .................................................. 252/429 R, 252/428, 252/430, 252/431
[51] Int. Cl. .......................................................... C08f 7/02
[50] Field of Search ............................................ 252/428, 429, 430, 431 C

[56] References Cited
UNITED STATES PATENTS
2,525,526 10/1950 Coover et al. ............... 252/431 C X
3,385,830 5/1968 Orde et al. .................... 252/431 C X Primary Examiner—Patrick P. Garvin
Attorney—Young & Quigg ABSTRACT: Compositions of matter prepared by the admixture of an ester of a halogenated carboxylic acid with a cuprous salt.

HALOESTER AND CUPROUS SALT POLYMERIZATION CATALYST SYSTEMS

This application is a divisional application of my copending application Ser. No. 610,466, filed Jan. 20, 1967.

This invention relates to a novel composition of matter. In another aspect, it relates to catalysts prepared by the admixing of a haloester with a cuprous salt.

The polymerization of monomeric material in aqueous emulsion is well known in the art. Numerous recipes have been developed for carrying out emulsion polymerization reactions to yield products possessing rubberlike characteristics. A constant search is being made to provide catalyst systems which produce higher yields of polymers of unsaturated organic compounds capable of undergoing an addition polymerization to form high molecular weight polymers while at the same time providing control of the polymerization rates and the product produced.

An object of the invention is to provide a catalyst system for the polymerization of monomers containing an active vinyl moiety.

Other objects, advantages and features of the invention will be apparent to one skilled in the art from the accompanying discussion and disclosure.

In accordance with the invention I have discovered a process for the emulsion polymerization of monomers containing an active vinyl moiety utilizing a catalyst system formed by admixing esters of halogenated carboxylic acids and cuprous salts. Further according to the invention I have discovered a new catalyst system for the emulsion polymerization of monomers containing an active vinyl moiety which is formed on admixing esters of halogenated carboxylic acids and cuprous salts.

The esters of the halogenated carboxylic acids used in the practice of the invention are represented by the formula

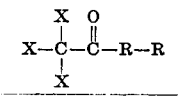

where X is a halogen chosen from fluorine, chlorine, bromine, iodine, and combinations thereof and R is an alkyl radical, an aryl radical, a cycloalkyl radical or combination thereof such as an aralkyl radical, an alkaryl radical, or the like, and the R radical contains from about one to 20 carbon atoms.

Preferred are the trihaloacetates wherein all the halogen atoms are the same and especially the trichloroacetates. Illustrative of the compounds which can be employed in the practice of the present invention are methyl trichloroacetate, ethyl tribromoacetate, isopropyl trifluoroacetate, tert-butyl triiodoacetate, n-octyl dibromochloroacetate, n-decyl dichlorofluoroacetate, 1-ethyl-1-n-propylheptyl chlorodiiodoacetate, n-pentadecyl trichloroacetate, n-eicosyl trichloroacetate, cyclopentyl trichloroacetate, cyclohexyl trichloroacetate, phenyl trichloroacetate, 1-naphthyl trichloroacetate, 2-naphthyl trichloroacetate, cyclopentylmethyl trichloroacetate, 7-cyclohexylheptyl trichloroacetate, benzyl trichloroacetate, 3,4-diphenylbutyl trichloroacetate, 2-methylcyclopentyl trichloroacetate, 3,4-di-n-butylcyclopentyl trichloroacetate, 2,3,4-tri-n-pentylcyclopentyl trichloroacetate, 4-methylcyclohexyl trichloroacetate, 2,4,6-triisopropylcyclohexyl trichloroacetate, 4-n-dodecylcyclohexyl trichloroacetate, 4-phenylcyclohexyl trichloroacetate, 4-tetradecylphenyl trichloroacetate, 4-methylphenyl trichloroacetate, 2,4,6-triethylphenyl trichloroacetate, 3,5-di-n-butylphenyl trichloroacetate, 4-cyclohexylphenyl trichloroacetate, and the like.

The cuprous salts as used in the present invention are such as are included in a Lewis definition of the term salt. The anionic moiety of the cuprous salts can be any inorganic $d_5$, $d_6$, $d_8$, $d_{10}$, $d_{12}$, $d_{13}$, $d_{15}$, and are sepH$_2$PO$_4{}^1$, HPO$_4{}^{11}$, HSO$_4{}^1$, CO$_3{}^{11}$, O$^{11}$, and the like, provided that the inorganic anion does not interfere with free radical-type reactions. Organic anions can also be used as the anionic moiety of the cuprous salts. The organic anions can be chosen from groups such as

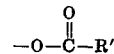

Where R' is alkyl, cycloalkyl, aryl, and combinations thereof such as aralkyl, cycloalkalkyl, and the like, provided that the total carbon atoms for the molecule do not exceed 25. Other anions such as the anions of sulfonic acid and phosphonic acid, anions sometimes termed sulfonyl and phosphonyl, respectively, and the like can also be employed as the anionic moiety of the cuprous salts provided that the anionic moiety of the salts does not contain more than 20 carbon atoms and is of the type that does not normally interfere with free radical-type reactions.

The catalyst systems of the present invention have found utility in emulsion polymerization systems of the oil-in-water type as are well known to the art. Cationic emulsifiers such as cetylbenzyldimethyl ammonium chloride, and nonionic emulsifiers such as 1-(omega-hydroxynonacosapolyethoxylene-p-phenylene)-2,2,3,3,-tetramethylbutane are preferred although anionic emulsifiers such as lauryl alcohol sodium sulfate can also be employed.

The monomeric material polymerized to produce polymers by the process of this invention comprises unsaturated organic compounds which generally contain the characteristic structure CH$_2$=C< and, in most cases, have at least one of the disconnected valences attached to an electronegative group, that is, a group which increases the polar character of the molecule such as a chlorine group or an organic group containing a double or triple bond such as vinyl, phenyl, cyano, carboxy, or the like. Included in this class of monomers are the conjugated butadienes or 1,3-butadienes such as butadiene (1,3butadiene), 2,3-dimethyl-1,3-butadiene, 3-methyl-1,3-butadiene, isoprene, piperylene, pentadiene-1,3,3-furyl-1,3-butadiene, 3-methoxy-1,3-butadiene, and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinyl-naphthalene and similar derivatives thereof, and the like; acrylic and substituted acrylic acids and their esters, nitriles and amides such as acrylic acid, metacrylic acid, methyl acrylate, ethyl acrylate, methyl alphachloro-acrylate, methyl methacrylate, ethyl methacrylate, butyl metacrylate, methyl ethacrylate, acrylonitrile, metacrylonitrile, methacrylamide, and the like, methyl isopropenyl ketone, methyl vinyl ketone, methyl vinyl ether, vinylethynyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple homopolymers are formed, or mixtures of two or more of such compounds which are copolymerizable with each other in aqueous emulsion may be polymerized to form copolymers.

The process of this invention is particularly effective when the monomeric material polymerized is a polymerizable aliphatic conjugated diolefin or a mixture of such a conjugated diolefin with lesser amounts of one or more other compounds containing an active CH$_2$=C< group which are copolymerizable therewith such as aryl olefins, acrylic and substituted acrylic acids, esters, nitriles and amides, methyl isopropenyl ketone, vinyl chloride, and similar compounds mentioned hereinabove. In this case the produces of the polymerization are high molecular weight homopolymers and copolymers which are rubbery in character and may be called synthetic rubber. Although, as can be readily deduced from the foregoing, there is a host of possible reactants, the most readily and commercially available monomers at present are butadiene itself (1,3-butadiene), styrene and isoprene. The invention will, therefore, be more particularly discussed and exemplified with reference to these typical reactants.

The polymerization of the present invention can be carried out in conventional equipment and by techniques which are well known to the art.

In accordance with the present invention temperatures may range from about −40° F. to about 170° F. with temperatures from about 25° F. to about 160° F. usually preferred. Obviously when polymerizations are carried out in aqueous emulsions in the absence of freezing point depressants, temperatures below the freezing point of water cannot be employed. The use of various additives, however, makes a process of the type disclosed herein applicable at lower temperatures. Inorganic salts and alcohols can be used for lowering the freezing point of the water. An example of such a low temperature system is a glycerine-water solution, and the term "aqueous emulsion" should be construed to include the use of an aqueous medium comprising water and a sufficient amount of a water-soluble component, preferably organic, to lower the freezing point below the desired polymerization temperature. A variety of modifiers, such as an alkyl mercaptan, dialkyl dixanthogens, diarylmono- and di-sulfides, tetraalkylthiuram mono- and di-sulfides, and mercaptothiazoles, can be used to advantage in the process of the present invention. After the desired polymerization has been achieved, the polymerization reaction can be shortstopped and the polymer recovered by conventional methods well known in the art. In general, the catalyst system of this invention catalyzes emulsion polymerization reactions over a broad range of time, temperature, pressure and concentrations. Preferably, however, the temperature should be between 25° F. and 160° F., the amount of water employed is from about 100 to 600 parts by weight per 100 parts of monomer. The reaction time is between 0.5 and 25 hours, and the mol ratio of cuprous salt to haloester compound is within the range of 0.1:1 to 10:1, preferably within the range of about 0.15:1 to 5:1. The total catalyst system should comprise between 0.2 and 500 millimoles per 100 grams of monomer, preferably between 2 and 100 MHM. A pressure sufficient to maintain the polymerization reaction mixture substantially completely in the liquid phase is preferred, and pressures between 10 and 50 p.s.i. have been found very effective.

The polymers thus formed can be recovered by any conventional technique. For instance, such polymers can be coagulated with an alcohol, or a salt can be employed to coagulate the polymers from the latex formed. Of course, conventional methods can be employed to process the resultant polymers. If conditions and monomers are such that an elastomer is formed, conventional rubber-processing methods such as blending with carbon black, extenders, stabilizers, and the like, can be employed. Such elastomers can be cured by conventional methods. On the other hand, if the monomers and conditions are such that thermoplastics are formed as the polymers, conventional thermoplastic technology can be employed to process such polymers and fabricate them into familiar thermoplastic items of everyday utility. The latex per se can also be employed for such uses as a sticker for application of agricultural pesticides or as an additive to improve the strength of concretes.

The valuable polymers produced by the process of this invention can be employed as adhesives, plastics, sealants, surface coatings, and the like, and in the manufacture of tires, hose, gaskets, sponge, and the like.

The following examples, disclosing the general technique and recipes, demonstrate the utility of the polymerization process in accordance with the present invention. The reactants and their proportions and the specific ingredients are presented as being typical and should not be construed to limit the invention unduly.

General technique: The emulsifier and water mixture was charged to a glass reactor. The cuprous salt was weighed and added to the mixture in the reactor. The reactor was then sealed and flushed with nitrogen by pressuring the reactor to 25 p.s.i. with nitrogen and then evacuating the reactor at least three times. The monomer or monomers and the ethyl trichloroacetate component of the catalyst system were then charged to the reactor. The reactor was again pressured to 25 p.s.i.g. with nitrogen and the mixture within the reactor was then tumbled at a stated constant temperature for the desired reaction time. At the end of the reaction period, 3 ml. of 0.4M 2,6-di-tert-butylhydroquinone in isopropanol was used to shortstop the polymerization reaction. The contents of the reactor was then poured into anhydrous isopropanol and the isopropanol mixture was stirred to coagulate the polymer. The isopropanol phase was then decanted from the polymer. The polymer remaining was then dissolved in toluene and the toluene polymer solution filtered to remove undissolved solids. Three ml. of A 02246 solution [0.1 g. 2,2′-methylene-bis(4-methyl-6-tert-butylphenol)-/ml. isopropanol solution] was then added to the toluene polymer solution as a stabilizer. Isopropanol was added to coagulate the polymer. The diluents were then removed from the polymer leaving a purified polymer. The polymer was then dried under vacuum at 60° C. for 16 hours. The runs in the following examples were made with one-tenth of the recipe amounts, i.e., 10 gm. of monomer.

EXAMPLE I

The runs reported in the following table were conducted by the general technique at a temperature of 122° F.

TABLE I

|  | Run | | | | |
| --- | --- | --- | --- | --- | --- |
|  | 1 | 2 | 3 | 4 | 5 |
| Monomer, parts by weight | [1] 100 | [2] 100 | [3] 100 | [2] 75 [1] 25 | [2] 25 [1] 75 |
| Water (PHM) [4] | 200 | 400 | 500 | 400 | 400 |
| Emulsifier type | [5] Dup-ME | [6] AM-T | AM-T | AM-T | AM-T |
| Emulsifier wt.[7] (phm.) | 5 | 7.5 | 7.5 | 7.5 | 7.5 |
| $Cu_2Cl_2$ (mhm.) [8] | 60 | 9 | 9 | 6 | 6 |
| $Cl_3CCO_2Et$ (mhm.) | 60 | 4.5 | 4.5 | 3 | 3 |
| Time (hours) | 6 | 5 | 22 | 6 | 6 |
| Conversion (percent) [9] | 74 | 60 | 30 | 76 | 94 |

[1] Styrene.
[2] 1,3-butadiene.
[3] Isoprene.
[4] phm.=parts per hundred parts of monomer.
[5] Dup-Me=Duponol ME, a trademark for a sodium lauryl sulfate product.
[6] AM-T=Ammonyx-T, a trademark for a cetyl dimethyl benzyl ammonium chloride solution product (25% by wt. of active ingredient in $H_2O$ solution).
[7] Wt. is given as parts by weight of active component per 100 parts by weight of monomer(s).
[8] mhm.=millimoles/100 parts by weight of monomer(s).
[9] Conversion (percent)=g. of polymer recovered times 100 divided by g. of monomer charged.

This example clearly demonstrates that the catalyst systems of this invention are effective polymerizing agents for a variety of compounds containing an active vinyl moiety and for combinations thereof in aqueous emulsion systems.

EXAMPLE II

In the runs reported in the following table the emulsifier type was Dup-Me, emulsifier weight was 7.5 PHM, monomer was styrene, temperature was 122° F., and time was 22 hours.

TABLE II

| | Run | | | |
|---|---|---|---|---|
| | 1 | 2 | 3 | 4 |
| Styrene, parts by wt | 100 | 100 | 100 | 100 |
| Water (PHM) | 200 | 200 | 200 | 200 |
| $Cu_2Cl_2$ (MHM) | 6 | 6 | 0 | 0 |
| $Cl_3CCO_2Et$ (MHM) | 6 | 0 | 6 | 0 |
| Conversion (percent) | 64 | 0 | 4 | 0 |

This example clearly demonstrates the necessity for both components of the catalyst system.

EXAMPLE III

In the following runs, the emulsifier type was AM-T, emulsifier weight was 7.5 PHM, monomer was butadiene, and temperature was 122° F.

TABLE III

| | Run | | | | | | |
|---|---|---|---|---|---|---|---|
| | 1 | 2 | 3 | 4 | 5 | 6 | 7 |
| Butadiene, parts by wt | 100 | 100 | 100 | 100 | 100 | 100 | 100 |
| Water (PHM) | 400 | 400 | 400 | 400 | 400 | 400 | 400 |
| $Cu_2Cl_2$ (MHM) | 6 | 6 | 6 | 6 | 6 | 12 | 18 |
| $Cl_3CCO_2Et$ (MHM) | 1.5 | 3.0 | 6.0 | 12 | 30 | 6.0 | 6.0 |
| Time (hours) | 5 | 5 | 6 | 5 | 5 | 5 | 5 |
| Conversion (percent) | 30 | 26 | 50 | 35 | 39 | 52 | 18 |

This example demonstrates that the molar ratio of the two components of the catalyst system can be varied.

EXAMPLE IV

In the following runs, the emulsifier type was AM-T, emulsifier weight was 7.5, monomer was butadiene, and temperature was 122° F.

This example demonstrates that copper salts are effective components of the catalyst system while salts of closely related metals are not effective. It also demonstrates that a halogenated ester is necessary in this catalyst system; other types of halogenated compounds tested were not effective.

EXAMPLE V

In the runs reported in the following table, the emulsifier type was AM-T, emulsifier weight was 7.5 PHM, monomer was butadiene, temperature was 122° F., and time was 6 hours.

TABLE V

| | Run | | | | | |
|---|---|---|---|---|---|---|
| | 1 | 2 | 3 | 4 | 5 | 6 |
| Butadiene, parts by weight | 100 | 100 | 100 | 100 | 100 | 100 |
| Water (phm.) | 400 | 400 | 400 | 400 | 400 | 400 |
| $Cu_2Cl_2$ (mhm.) | | 6 | 7 | 7 | 6 | 7 |
| $Cl_3CCO_2Et$ (mhm.) | | | | | | 6.1 |
| $Cl_3CCO_2H$ (mhm.) | 12.0 | 1.59 | 3.24 | 6.86 | 12.5 | |
| Conversion (percent) | 0 | 1 | Trace | 0 | 0 | 31 |

From the above example, it is clearly evident that the unexpected results obtained by the use of the haloester, as compared to those obtained by use of the halo acid, clearly demonstrate a new polymerization catalyst system.

Many modifications of this invention will be apparent to those skilled in the art upon a study of the accompanying disclosure. Such modifications, being clearly apparent from this disclosure, are believed to be within the spirit and the scope of this invention.

That which is claimed is:

1. A composition of matter consisting essentially of an admixture of (I) an ester of a trihalogenated carboxylic acid $$X-\underset{X}{\overset{X}{\underset{|}{C}}}-\overset{O}{\overset{\|}{C}}-O-R$$

wherein each X is selected from the group consisting of fluorine, bromine, chlorine and iodine, and wherein R contains up to about 20 carbon atoms and is selected from the group consisting of alkyl, aryl, cycloalkyl, and combinations thereof and (II) a cuprous compound wherein the anionic moiety of said cuprous compound is selected from the group consisting of $F^1$, $Cl^1$, $Br^1$, $I^1$, $SO_4^{11}$, $HSO_4^1$, $S^{11}$, $PO_4^{111}$, $HPO_4^{11}$, $H_2PO_4^{1ah.}$, $CO_3^{11}$, $O^{11}$, and $-O-\overset{O}{\overset{\|}{C}}-R'$ wherein said R' has up to about 25 carbon atoms and is selected from the group consisting of alkyl, cycloalkyl, aryl, and combinations thereof, wherein said composition comprises from about 1:10 to about 1:0.1 moles of said (I) per mole of said (II).

2. A composition of matter consisting essentially of an admixture of (I) a trihaloacetate ester wherein moiety derived from an alcohol is represented by R wherein said R contains up to 20 carbon atoms and is selected from the group consisting of alkyl, aryl, cycloalkyl, and combinations thereof, and (II) a cuprous salt selected from the group consisting of cuprous halides and cuprous sulfide, and wherein said admixture contains a mole ratio of from 1:0.1 to 1:10 of said trihaloacetate to said cuprous salt.

TABLE IV

| | Run | | | | | | | | |
|---|---|---|---|---|---|---|---|---|---|
| | 1 | 2 | 3 | 4 | 5 | 6 | 7 | 8 | 9 |
| Butadiene, parts by wt | 100 | 100 | 100 | 100 | 100 | 100 | 100 | 100 | 100 |
| Water (phm.) | 400 | 400 | 400 | 400 | 400 | 400 | 400 | 400 | 400 |
| Metal salt type | $Cu_2Cl_2$ | $Cu_2Cl_2$ | $Cu_2Cl_2$ | $Cu_2Cl_2$ | $Cu_2Cl_2$ | $Cu_2Cl_2$ | $Cu_2S$ | $CoCl_2$ | $FeCl_3$ |
| Metal salt concentration (mhm.) | 12 | 12 | 12 | 12 | 12 | 10 | 10 | 10 | 10 |
| Halo compound | $Cl_3CCO_2Et$ | $CHCl_3$ | 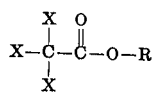 | (¹) | (²) | $Cl_3CCO_2Et$ | $Cl_3CCO_2Et$ | $Cl_3CCO_2Et$ | $Cl_3CCO_2Et$ |
| Halo compound concentration (mhm.) | 6 | 6 | 6 | 6 | 6 | 5 | 5 | 5 | 5 |
| Time (hrs.) | 5 | 5 | 5 | 6 | 6 | 5 | 5 | 5 | 5 |
| Conversion (percent) | 34 | 0 | 0 | 0 | 0 | 21 | 5 | 0 | 0 |

¹ Allyl chloride.
² n-Butyl iodide.

3. A catalyst consisting essentially of an admixture of (I) a trihaloacetate

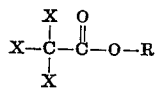

wherein each X is selected from the group consisting of fluorine, bromine, chlorine, and iodine, and wherein R contains up to about 20 carbon atoms and is selected from the group consisting of alkyl, aryl, cycloalkyl, and combinations thereof, and (II) a cuprous compound selected from the group consisting of cuprous halides and cuprous sulfide, wherein said catalyst comprises from about 1:10 to about 1:0.1 moles of said (I) per mole of said (II).

4. A catalyst as defined in claim 3 wherein said (I) trihaloacetate is ethyltrichloroacetate and said (II) is cuprous chloride.

5. A composition of matter consisting essentially of an admixture of (I) ethyltrichloroacetate and (II) cuprous chloride or cuprous sulfide, wherein said admixture contains a mole ratio of from 1:0.1 to 1:10 of said ethyltrichloroacetate to said cuprous chloride or cuprous sulfide.

UNITED STATES PATENT OFFICE
CERTIFICATE OF CORRECTION

Patent No. __3,609,098__   Dated __September 28, 1971__

Inventor(s) __James D. Brown__

It is certified that error appears in the above-identified patent and that said Letters Patent are hereby corrected as shown below:

Claim 1, lines 41-44 should read:

--- consisting of $F^-$, $Cl^-$, $Br^-$, $I^-$, $SO_4^=$, $HSO_4^-$, $S^=$, $PO_4^{\equiv}$, $HPO_4^=$, $H_2PO_4^-$, $CO_3^=$, $O^=$, and $-O-\overset{\overset{O}{\|}}{C}-R'$ ---.

Signed and sealed this 24th day of October 1972.

(SEAL)
Attest:

EDWARD M. FLETCHER, JR.
Attesting Officer

ROBERT GOTTSCHALK
Commissioner of Patents